Feb. 18, 1958 C. S. THAYER 2,824,057
ELECTROLYTIC REDUCTION CELL FOR PRODUCING ALUMINUM
Filed Aug. 12, 1950 2 Sheets-Sheet 1
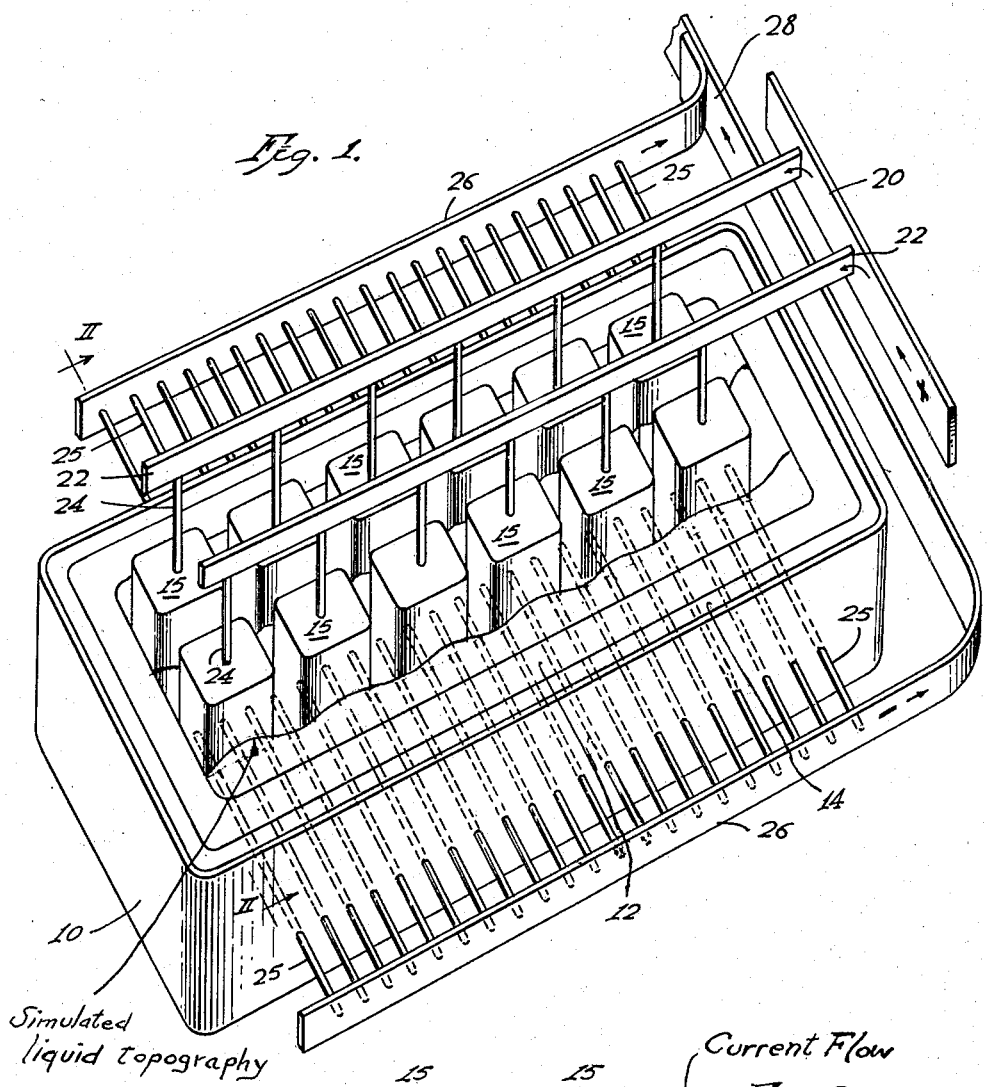
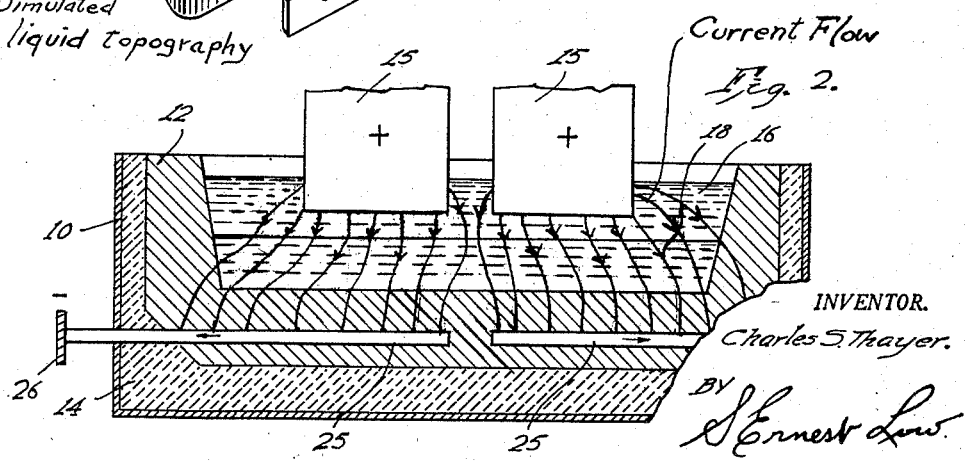
INVENTOR.
Charles S. Thayer.
BY
S. Ernest Low.

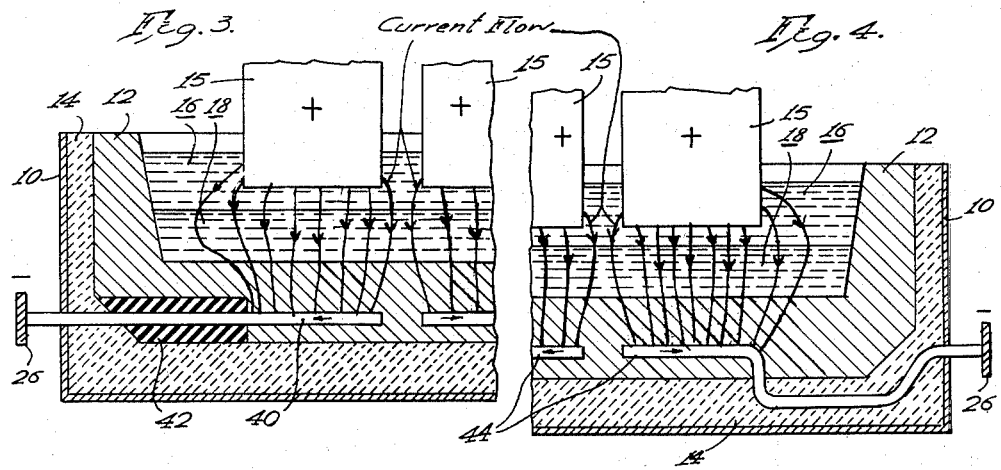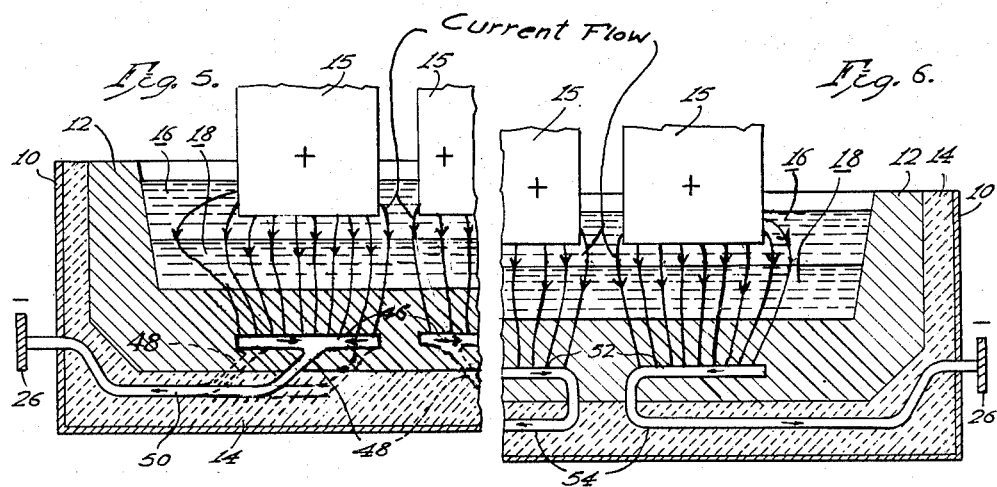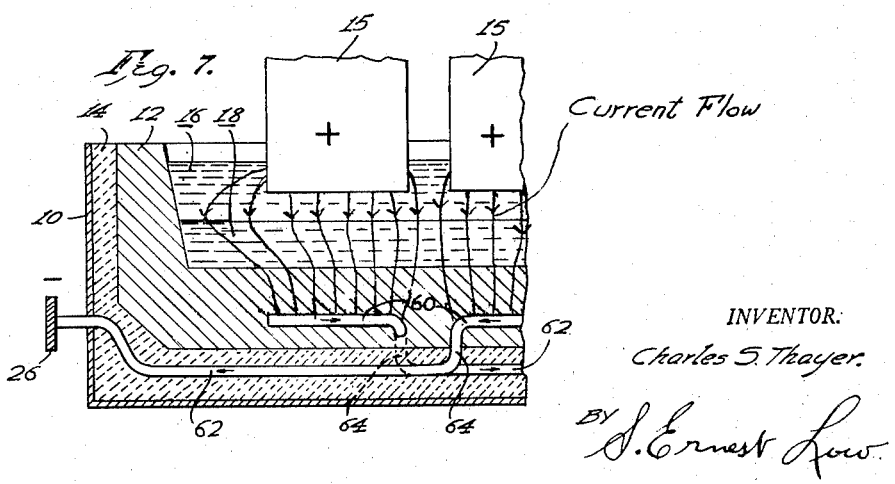

United States Patent Office 2,824,057
Patented Feb. 18, 1958

2,824,057

ELECTROLYTIC REDUCTION CELL FOR PRODUCING ALUMINUM

Charles S. Thayer, Vancouver, Wash., assignor to Aluminum Company of America, Pittsburgh, Pa., a corporation of Pennsylvania Application August 12, 1950, Serial No. 179,037

4 Claims. (Cl. 204—243)

This invention relates in general to the construction and operation of electric furnaces, cells or "pots" suitable for the production of aluminum by the electrolysis of a fused salt bath.

It is a well-known fact that a conductor carrying electric current produces a magnetic field surrounding it and that the direction of the field bears a definite relationship to the direction of the current within the conductor. The direction of the magnetic field is determinable by the "thread rule"; that is, it is the same as the direction of rotation of a screw, having a right hand thread, when the screw is turned to axially move the same in the direction of current flow. The intensity of the magnetic field at any point is proportional to the intensity of the current flow in the conductor and inversely proportional to the distance between the point under consideration and the current-carrying conductor.

It is an equally well-known fact that a force is exerted on a conductor carrying an electric current in a magnetic field provided the field has a directional component at right angles to the flow of current. The force tends to move the conductor at right angles to the direction of both the current and the component of the magnetic field lines at right angles to the current. The direction of the force exerted on a conductor is readily determinable by the "left hand rule," where the index finger is pointed in the direction of current flow in the conductor, the thumb at right angles to the index finger is pointed in the direction of the magnetic field, and the second finger at right angles to the thumb and index finger is pointed in the direction of the force exerted on the conductor. The intensity of the force exerted upon a conductor carrying current in a magnetic field is proportional to the intensity of current flow in the conductor, the intensity of the component of the magnetic field at right angles to the conductor and the length of the path of flow of the current within the magnetic field.

These principles apply whether the electrical conductor be solid or liquid. In the case of fluid or liquid conductors, such as a molten metal pad or pool carrying an electric current within an electrolytic cell, any external magnetic field acting at right angles to the direction of flow of the current reacts to set the molten metal conductors in motion, which may result in circulation of the liquid conducting phase in the apparatus confining the same and cause a departure from an otherwise level surface of the molten metal. This motion and circulation is known as "motor effect" and the development of uneven, more or less stationary crests in the conducting molten metal phase within the apparatus is termed metal "pile-up."

In the electrolytic production of aluminum, the specific gravity of the molten metal layer, lying beneath the molten bath layer, is so near to the specific gravity of the latter that the force required to produce "pile-up" of the metal is much less than it would be if the metal layer was in air; since the force tending to level off the metal surface is only that due to the difference between the specific gravities (metal sp. g.—bath sp. g.) instead of that due to the difference between the specific gravity of the metal and that of the air.

This metal "pile-up" is seriously objectionable as it causes considerable variation in the distance between anode and cathode, over the surface of the metal cathode (pool), and may even cause the molten metal to touch an anode and produce a partial short circuit, thus reducing the efficiency of the cell. Metal "pile-up" is also a condition which, in practice, limits the anode-cathode distance, so that the latter cannot be made as small as would be desirable for the purpose of reducing the voltage lost in forcing the current through the bath, and thus reducing the power consumed per pound of metal produced. Power is a very important item of cost in the production of aluminum, and a reduction in the power required per pound of metal means a definite reduction in cost, and hence is most desirable.

The drawings, forming a part hereof, will serve to illustrate my invention, in which:

Fig. 1 represents a diagrammatic perspective view of a typical electrolytic reduction pot or cell suitable for the production of metallic aluminum from its oxide;

Fig. 2 represents a fragmentary sectional elevation taken on the plane II—II of Fig. 1;

Fig. 3 represents a fragmentary sectional elevation through a portion of an electrolytic cell in which one embodiment of my invention has been incorporated; and Figs. 4 through 7 represent fragmentary sectional elevations of further embodiments of my invention.

The invention is directed in general to the provision of electrically conducting, resistance heated apparatus with molten contents, such as electrolytic reduction cells for the production of metallic aluminum from alumina. In more specific terms, the invention relates to electrolytic reduction cells in which the direction and intensity of the magnetic fields developed by the anode and cathode conductors serving the cells, as well as the direction and intensity of the electric currents carried thereby and through the molten cathode contents of the cells, are controlled by proper selection and dispositions of cathode collector bar arrangements, embedded within the bottoms of the cells, in respect to their physical relationship to cathode bus bars in electrical connection with the embedded collector bars.

Referring to the illustrations, and in particular Figs. 1 and 2, a typical electrolytic cell or pot, suitable for the manufacture of metallic aluminum from its oxide, is shown in perspective and sectional elevation, respectively. It will be observed that the cell comprises, in its essential elements, an outer steel shell 10 having an inner electrically-conductive carbon lining 12 and an intermediate heat and electrical insulating barrier 14. The lining 12 may be built up from prebaked carbon blocks or rammed in situ and thereafter baked. The heat insulating barrier 14 may be constructed from suitable fire brick or crushed insulating material.

Any suitable anodes 15, for introducing electric current, are supported above the cell and depend downwardly into an upper layer of electrolyte 16 which, because of its lower specific gravity, floats or rests upon the cathode layer of molten aluminum 18 which lies in the bottom of the cell cavity. The anodes 15 are preferably rectangular carbon blocks and are supported in such a manner (not specifically illustrated) that they are readily adjustable vertically to maintain proper anode-cathode distance between the normally flat underside of the anodes 15 and the molten metal pad 18.

Any desired arrangement of electrical conductors may be employed to supply current to the anodes, an aluminum or copper bus bar 20, and similar bus bars 22 leading to each of the rows of carbon anodes 15, being here illustrated for this purpose. Electrically-conductive bars or rods 24 of copper not only serve to conduct electric current to the anodes 15, but also to support the same from above the cell.

In the normal operation of the cell thus far described, a fused electrolyte of dissolved alumina in cryolite, represented by the layer 16, is electrolyzed by the flow of direct current supplied through the anode system, and the alumina charge is electrolytically reduced to molten metallic aluminum which collects in the bottom of the cell, as represented by the pad or pool 18.

It has been common practice to complete the current circuit through a cell of the type above described by means of a cathode system comprising, in general, the molten metal cathode 18, conductive carbon lining 12 and horizontal collector bars 25 embedded within the carbon lining 12 below the molten metal cathode 18. Collector bars 25, embedded in the carbon lining 12, beneath the respective rows of anodes 15, normally extend laterally through the shell 10 on either side of the cell. The protruding exterior ends of the collectors 25, which are preferably steel or iron bars, are suitably connected by cathode conductor bars 26, of copper, to an aluminum or copper cathode bus bar 28.

In a commercial installation, it is normal practice to arrange a large number of cells or pots in single or multiple tandem rows, in which case the cells are electrically connected in series, with the cathode bus bar 28 of one pot discharging its current into the anode bus bar 20 of the next succeeding pot in the line.

Depending on the direction and density of currents within the liquid conductors and the distribution and strength of the magnetic fields within the pot cavity, the motor effects may be quite vigorous in cells of the type described herein and illustrated in Figs. 1 and 2. Some motion in the bath, which serves to stir it and distribute additions of alumina throughout the fused cryolite during continued operation of a cell, is desirable. However, under the relatively high operating current (30,000 to 50,000 amperes) employed in cells of the type under discussion, too vigorous agitation of the fluid charge (electrolyte 16, and especially molten metal pad 18) within the cell, and resultant pile-up of the metal pad 18, has been found to give inefficient pot operation, as heretofore described.

In a cell constructed as shown in Fig. 1, the currents carried by buses 22 and 26 set up magnetic fields within the cell cavity containing the molten bath 16 and molten metal pad 18. The fields set up by the bus bars 22 have a generally horizontal direction within the cavity, parallel to the direction of the collector bars 25, while the fields set up by the bus bars 26 have a generally vertical direction in the cavity. All currents flowing within the cell itself and adjacent to it set up their respective magnetic fields. The actual magnetic field direction and strength at any point is the resultant of all magnetic fields having an influence at that point.

In the cell shown in Figs. 1 and 2, the currents which flow in a vertical direction in the liquid conductors within the cell (bath 16 and metal 18) are of relatively low current density and are of short length. Consequently, under the given magnetic conditions, the force causing motion due to their interaction with the magnetic field, is relatively small.

The current passing through the cell, from the anodes 15 to the cathode bus 26, divides itself so as to occupy all possible paths, in inverse proportion to the electrical resistance of such paths. The molten aluminum has by far the lowest specific resistance of the materials through which the current flows, and when a moderately thick layer is present, the cross section presented for a horizontal flow of current is very large. Taking into consideration the relatively high current density in the steel collector bars 25 and the large cross section of the carbon lining 12 as compared with that of the collector bars, it is evident that the path of least resistance is nearly vertically down from the anode to the molten metal pool, then to some extent horizontally toward the side of the cavity, and thence downward into the collector bars, as diagrammatically indicated in Fig. 2. The dimensions of commerical aluminum cells are such that the density of current flowing horizontally in the metal may be relatively high and the length of path relatively long, as compared with the density and length of path of the vertical currents. Such horizontal flow of current in the molten metal, lying in a vertical magnetic field, imparts to the metal a motion which is a function of current and field strengths and directions. Under some conditions this motion is of such intensity as to seriously interfere with efficient and satisfactory operation of the cell. Horizontal fields parallel to the current flow have no effect, and horizontal fields at right angles to the current flow a relatively small one.

It is found by experience that the horizontal flow of the current in a vertical magnetic field is the principal cause of the objectionable motion in the metal. By increasing the thickness of the metal pad the current density in the horizontal flow can be reduced, and this reduces somewhat the metal motion and "pile-up."

For minimum motion it is necessary to reduce to a minimum the vertical component of the magnetic field passing through the molten aluminum. This vertical component is chiefly due to the current in the parallel bus bars 26 and is particularly great at the rear of the pot, because of the increase in current density in bus bars 26 as they approach the rear of the pot, and the effect of the piece of bus 28 passing across the rear end of the pot. This effect can be minimized by arranging matters so that both these bus bars 26 carry the same amount of current; in which case, since they are parallel conductors carrying current in the same direction, their fields tend to partly neutralize each other in the space between them. In fact this neutralization is approximately complete near the center of this space, but is progressively less complete as either side of the cavity is approached.

If the cell cavity shown in Figs. 1 and 2 is relatively narrow, as compared with the total distance between the bus bars 26, the mutual neutralization of the two fields may be nearly complete throughout the cavity. If, however, a wider cell cavity is employed, as is necessary in large cells, the neutralization is incomplete and a substantial vertical component of electromagnetic field remains near the sides of the cavity. In such a case, additional means may need to be employed to minimize the electromagnetic motion of the molten aluminum.

The remaining available means for reducing electromagnetic motion of the molten aluminum is to reduce the length of the path of horizontal flow of the current within the molten aluminum, and if necesary to reduce such horizontal flow to zero; that is, to cause the current flow to be substantially vertically downward through the molten metal into the lining 12 of the cell and into the collector bars 25. This may be accomplished by a suitable arrangement or design of the collector bars. A number of methods of accomplishing this result are shown in Figs. 3 to 7, inclusive.

Referring now to Fig. 3, a fragmentary sectional elevation of an electrolytic reduction cell is illustrated in which one embodiment of my invention has been incorporated. It can be assumed that the cell of Fig. 3 includes all of the elements of Figs. 1 and 2 and differs therefrom only insofar as the arrangement of the cathode collector bars is concerned. In Fig. 3 each cathode collector bar 40 is provided with a suitable electrical insulation 42, in the form of a tile sleeve, or the like, which insulates a substantial portion of the collector otherwise in direct electrical contact and communication with the electrically-conducting carbon lining 12 laterally disposed outside the projected area of the bottom surfaces of anodes 15. Preferably, the collectors 40 are in direct electrical contact with the carbon lining 12 immediately below the anodes 15, as viewed across the narrow dimension of a rectangular cell.

It will be observed that the electrical resistance to lateral current flow from the anodes 15, through the electrolyte 16 and molten metal pad 18 to the carbon lining 12 at the sides and ends of the cell, and thence to the collectors 40, has been substantially increased by the electrical insulation 42 on cathode collector bars 40. Expressing this in another way, the path of least electrical resistance from the anodes 15 to the cathode collector bars 40 is substantially vertical through the bath 16 and molten metal pad 18, and paths involving horizontal flow through the metal pad have their resistance substantially increased, so the flow through them is greatly reduced. Since vertical current flow in the fluid conductors is not objectionable, motor effect and pile-up have been substantially eliminated through the use of the installation represented at Fig. 3.

In Fig. 4 a further embodiment of the invention is illustrated in which the cathode collector bars 44 are disposed in direct electrical contact and communication with the cathode-carrying, electrically-conducting carbon lining 12 for the portion of their length immediately below the anodes 15. The remainder of the length of each cathode collector bar 44 is bent downwardly and outwardly into and through the non-electrically-conducting insulation 14. This construction is thus the full equivalent of the insulated cathode collector bars 40 of Fig. 3.

A substantially T-shaped cathode collector bar system is illustrated in Fig. 5. In this embodiment of the invention, the cathode collector bars comprise a horizontal portion 46 directly below the anodes 15 embedded in electrical contact with the carbon lining 12. The portions 46 of the bars each form the cross bar or head of a T and the bars otherwise complete the T form through the depending legs 48, shown in full line construction running from substantially the mid-point of each of the bars 46 and extending downwardly into the non-conducting heat insulation 14. Generally horizontal collector legs 50 extend laterally through the heat insulation into electrical connection with the cathode collector bars 26. This particular cathode collector bar construction has proved very satisfactory in electrolytic cell operation and is the full equivalent of the cathode collector systems illustrated in Figs. 3 and 4. The legs 48, shown in dotted line construction adjacent the ends of collector bars 46, illustrate modified forms of the collector bar system of Fig. 5, which will be described in detail hereinafter.

It may be desirable to reverse the usual direction of the electromagnetic motion or motor effect in one or more areas of an electrolytic cell in order to control and/or eliminate the motor effect. I have accomplished this by employing cathode collector bar systems, as illustrated in Figs. 6 and 7, wherein only those features of design and construction that differ from the previously described cells require consideration. In the two embodiments of the invention shown in Figs. 6 and 7, it will be found that the cathode collector bars not only establish the path of least resistance to current flow in generally vertical lines, but also establish a generally inward current flow towards the central long axis of the pot or cell. This latter feature further eliminates horizontal current flow to the sides of the cell, with its resultant interaction with the vertical magnetic fields. In fact, by establishing not only generally vertical current flow but also a generally inward current flow towards the central long axis of the pot or cell, the force tending to cause motion of the molten aluminum tends to be in the reverse direction from that when the horizontal current flow is toward the sides of the cell.

In Fig. 6 a cathode system is represented in which a horizontal U-bend is imparted to the individual collector bars. Each of the upper legs 52 of the bars is embedded in the carbon lining 12 directly below the anode 15 on that side of the cell containing the lead off conductor portion 54. From the directional current flow arrows, it will be seen that there is the same general path of least electrical resistance established for current flow from the anodes 15 downwardly and inwardly towards the long axis of the cell into the cathode bars 26.

Referring to Fig. 7 it will be observed that the cathode collector bars 60 have been embedded in the carbon lining 12 to serve as conductors disposed on opposite sides of the long axis of a rectangular cell. Actually this arrangement provides an X-type or crossed collector bar system which tends to establish vertically inward electric current flow towards the center of the cell. Conductor portions 62 within the insulating layer 14, and connector portions 64 incorporated in the continuous electrical relationship, complete the X-type installation.

In the illustrations and descriptions of the several embodiments of the invention, a double row of anodes 15 has been illustrated in each instance. This arrangement is quite customary where prebaked carbon anodes are employed. The invention, however, has been equally successful in practice with the Söderberg type, self-baking electrode where a single anode is generally employed in each cell. In a Söderberg installation the cathode collector bars are installed in the same manner as described for a double row anode arrangement, in which case the current is led out of the single anode through the bath, metal pool and cell lining, into collector bars embedded in the conductive lining 12 directly beneath the projected area of the bottom face of the anode and otherwise insulated from the lining 12 in their connection to the cathode conductor bars 26 and cathode bus bar 28.

It will also be observed that all of the cathode collector bar systems described above and illustrated in Figs. 3 to 7, inclusive, have been so designed and installed as to insure maximum vertical current flow between the anodes 15 and the respective cathode collector bars. In respect to Figs. 6 and 7, centrally inward, as well as vertical paths of current flow, are established in the metal layer, and lateral outward current flow to the sides of the cell has been diminished, if not entirely eliminated.

Referring further to Fig. 5, the dotted line construction of the legs 48 of the T-form collector bar system is now described. The dotted line construction illustrates alternate locations and connections adjacent either end of the bars 46 for the full line leg 48. Depending on whether the leg 48 is located towards or at the inner or outer end of a collector bar 46, as distinguished from a central connection for the same, either centrally inward, or lateral outward current flow in the metal layer, respectively, will be established to some degree, in addition to the aforedescribed vertical current flow.

It will also be understood that those electrical conducting portions of the various cathode systems illustrated in Figs. 3 through 7 that have been shown as embedded within the heat insulation layer 14 may, if desired, be disposed outside the cells. In general, it is preferred to employ iron or steel construction for the cathode collector bar structures hereinabove described.

Having described the invention in terms of several specific embodiments of the same, it is to be understood that it is not to be limited to the specific illustrations, except insofar as it is defined in the appended claims.

What is claimed is:

1. An electrolytic cell for producing aluminum from its oxide which comprises a substantially rectangular open top shell having its side walls and bottom lined with an insulating material and a carbon bottom lining supported on the bottom insulating material to provide a cell cavity for confining a charge of fused electrolyte and underlying molten aluminum pool, at least two parallel rows of anodes depending downwardly into the cell cavity, said anodes being spaced from each other and the walls of said cell cavity, as well as being spaced on either side of the longitudinal center line of the cell, a cathode current-collector system comprising a substantially horizontal cathode bus bar disposed exterior to and adjacent each of two oppositely disposed side walls of the shell parallel to the longitudinal center line of the cell, spaced cathode collector bars embedded in the carbon bottom lining in parallel disposition in respect to the bottom surfaces of the anodes, said embedded cathode collector bars each having current-collecting lengths disposed within and below the top surface of the carbon bottom lining and confined to substantially the downwardly projected area of an anode above the same, an electrical conductor for each embedded cathode collector bar connecting its respective cathode collector bar to one of the exterior cathode bus bars, the connection between each electrical conductor and its respective embedded cathode collector bar being within substantially the downwardly projected area of an anode above the same, and the electrical conductors being otherwise electrically insulated from the cell cavity and its contents.

2. In an aluminum electrolytic reduction cell of substantially rectangular shape, and having a carbon bottom and side wall lining forming an open top cavity for confining a charge comprising a top layer of fused electrolyte and underlying molten aluminum pad, a pair of anodes laterally spaced in respect to each other and the walls of said cavity, said anodes being suspended above and extending downwardly into the cavity thereof, cathode collector bars each having a substantially horizontal current-collecting length embedded within and below the top surface of the electrically-conductive bottom lining in direct electrical contact therewith, the embedded length of each of the cathode collector bars being disposed within and confined to substantially the downwardly projected area of an anode above the same, a substantially horizontal cathode bus bar disposed exterior to and adjacent oppositely disposed side walls of the cell, an electrical conductor bar for each embedded length of cathode collector bar extending laterally therefrom through the carbon bottom into electrical connection with one of said cathode bus bars, and an electrical insulator sleeve on each of said electrical conductor bars over that length of the same within the carbon bottom of the cell outside substantially the downwardly projected area of the anodes facing the molten aluminum layer.

3. An electrolytic cell for producing aluminum from its oxide which comprises a rectangular open top shell having its side walls and bottom lined with carbon to provide a cavity in the cell for receiving a charge of fused electrolyte and underlying molten aluminum pad, at least two parallel rows of anodes depending downwardly into the cell cavity, said anodes being spaced from each other and the walls of said cell cavity, as well as being spaced on either side of the central axis of the cell, a cathode collector bar system comprising substantially horizontally disposed spaced collector bars having current-collecting lengths embedded within and below the top surface of the bottom carbon lining of the cell in substantial parallel disposition in respect to the top surface of the bottom carbon lining, said embedded lengths being confined to substantially the downwardly projected bottom surface areas of each parallel row of anodes and terminating short of the central axis of the cell, a cathode bus bar disposed substantially horizontally and exterior to opposite sides of the cell, and an electrical conductor for each embedded length of cathode collector bar separately connecting its respective embedded length of cathode collector to one of said exterior bus bars, said conductor bars being attached to the embedded lengths of cathode collector bars adjacent their inner ends, in respect to the central axis of the cell, and extending downwardly into an insulating lining underlying the bottom carbon lining and inwardly therethrough across the central axis of the cell below the embedded lengths of cathode collector bars into alternate electrical connection with one of the exterior cathode bus bars on opposite sides of the central axis of the cell.

4. An electrolytic cell for producing aluminum from its oxide which comprises a rectangular open top shell having its side walls and bottom lined with carbon to provide a cavity in the cell for receiving a charge of fused electrolyte and underlying molten aluminum pad, at least two parallel rows of anodes depending downwardly into the cell cavity, said anodes being spaced from each other and the walls of said cell cavity, as well as being spaced on either side of the central axis of the cell, a cathode collector bar system comprising substantially horizontally disposed collector bars having current-collecting lengths embedded within and below the top surface of the bottom carbon lining of the cell in parallel disposition in respect to the top surface of the bottom carbon lining, said embedded lengths being confined to substantially the downwardly projected bottom surface areas of each parallel row of anodes and terminating short of the central axis of the cell, a cathode bus bar disposed substantially horizontally and exterior to opposite sides of the cell, and an electrical conductor for each embedded length of cathode collector bar separately connecting its respective length of cathode collector to one of said exterior bus bars, said conductor bars being attached to the embedded lengths of cathode collector bars adjacent their outer ends, in respect to the central axis of the cell, and extending downwardly into an insulating lining underlying the bottom carbon lining and outwardly therethrough below the embedded lengths of cathode collector bars into electrical connection with the exterior cathode bus bar on the same side of the central axis of the cell.

References Cited in the file of this patent

UNITED STATES PATENTS

| | | |
|---|---|---|
| 1,534,322 | Hoopes | Apr. 21, 1925 |
| 2,034,339 | Gadeau | Mar. 17, 1936 |
| 2,526,875 | Jouannet | Oct. 24, 1950 |
| 2,528,905 | Ollivier | Nov. 7, 1950 |
| 2,593,751 | Grolee | Apr. 22, 1952 |

FOREIGN PATENTS

| | | |
|---|---|---|
| 473,043 | France | Sept. 5, 1914 |